(12) United States Patent
Pelletier

(10) Patent No.: US 8,515,057 B2
(45) Date of Patent: Aug. 20, 2013

(54) METHOD AND DEVICE FOR EXECUTING CRYTOGRAPHIC CALCULATION

(75) Inventor: Hervé Pelletier, Jouy le Moutier (FR)

(73) Assignee: Morpho, Issy-les-Moulineaux (FR)

(*) Notice: Subject to any disclaimer, the term of this patent is extended or adjusted under 35 U.S.C. 154(b) by 372 days.

(21) Appl. No.: 11/658,306

(22) PCT Filed: Jul. 8, 2005

(86) PCT No.: PCT/FR2005/001773
§ 371 (c)(1),
(2), (4) Date: Nov. 5, 2007

(87) PCT Pub. No.: WO2006/021641
PCT Pub. Date: Mar. 2, 2006

(65) Prior Publication Data
US 2009/0074181 A1 Mar. 19, 2009

(30) Foreign Application Priority Data
Jul. 22, 2004 (FR) .................................... 04 08139

(51) Int. Cl.
| | | |
|---|---|---|
| *H04L 9/28* | (2006.01) | |
| *H04L 9/10* | (2006.01) | |
| *H04L 9/00* | (2006.01) | |
| *H04L 9/06* | (2006.01) | |
| *H04L 9/08* | (2006.01) | |
| *G06K 17/00* | (2006.01) | |
| *G09C 1/00* | (2006.01) | |

(52) U.S. Cl.
USPC ............... 380/28; 380/30; 380/263; 380/277; 713/176; 713/193

(58) Field of Classification Search
USPC ................... 380/28, 263, 30, 277; 713/176, 713/193
See application file for complete search history.

(56) References Cited

U.S. PATENT DOCUMENTS
6,873,706 B1 * 3/2005 Miyazaki et al. ............... 380/30
(Continued)

FOREIGN PATENT DOCUMENTS
DE 10223715 A1 12/2003
(Continued)

OTHER PUBLICATIONS

Toorani, M., Falahati, A.; "A secure variant of the Hill Cipher"; Computers and Communications, 2009. ISCC 2009. IEEE Symposium on Digital Object Identifier: 10.1109/ISCC.2009.5202241; Publication Year: Jan. 2009, pp. 313-316.*
Search Report for FR 0408139, dated Dec. 30, 2004.
International Search Report for PCT/FR2005/001773, dated Dec. 5, 2005.

(Continued)

*Primary Examiner* — Nirav B Patel
*Assistant Examiner* — Courtney Fields
(74) *Attorney, Agent, or Firm* — Marshall, Gerstein & Borun LLP

(57) ABSTRACT

The invention concerns a method for executing cryptographic calculation in an electronic component, based on a specific cryptographic algorithm including at least one secret key operation (102) to be performed with a secret encryption key (103) comprising m secret encryption key blocks of n bits on a data block (101), wherein m and n are positive integers, and a non-linear operation (107). It consists in determining $2^n-1$ secondary secret keys (105) on n bits different from the secret encryption key block; then, for a given secret encryption key block, performing the secret key operation (102) with the secret encryption key block (103) and performing the secret key operation (102) with the secondary secret keys on a data block (101) and obtaining respectively a data block being encrypted (104) and $2^n-1$ secondary data blocks (106); then performing the non-linear operation (107) of the data block being encrypted (104) and on the secondary blocks (106); supplying data block encrypted from the data block being encrypted.

9 Claims, 5 Drawing Sheets

(56) References Cited

U.S. PATENT DOCUMENTS

| | | | |
|---|---|---|---|
| 7,050,581 B1 * | 5/2006 | Goubin et al. | 380/28 |
| 2005/0081038 A1 * | 4/2005 | Arditti Modiano et al. | 713/176 |
| 2008/0049940 A1 * | 2/2008 | Kocher | 380/277 |

FOREIGN PATENT DOCUMENTS

| | | | |
|---|---|---|---|
| EP | 1 263 163 A1 | 12/2002 | |
| FR | 2831739 A1 | 2/2003 | |
| GB | 2345229 A | 6/2000 | |
| WO | WO 02063822 A1 * | 8/2002 | |

OTHER PUBLICATIONS

Akker et al., "An Implementation of DES and AES, Secure Against Some Attacks," CHES 2001, LNCS, pp. 309-318, 2001.

Golic et al., "Multiplicative Masking and Power Analysis of AES," CHES 2002, vol. 2523, pp. 198-212, 2003.

Mayer-Sommer, Rita, "Smartly Analyzing the Simplicity and the Power of Simple Power Analysis on Smartcards," CHES Proceedings of the Second International Workshop on Cryptorgaphic Hardware and Embedded Systems, 2000.

* cited by examiner

METHOD AND DEVICE FOR EXECUTING CRYTOGRAPHIC CALCULATION

The present invention relates to the field of cryptography and more particularly to the protection of the confidentiality of the keys used by cryptographic algorithms.

Cryptographic algorithms have the objective of encrypting data. Such algorithms generally comprise a stringing together of several operations, or calculations, that are applied successively to a data item to be encrypted so as to obtain an encrypted data item. These algorithms use secret keys.

Cryptographic algorithms such as these may undergo "attacks" which are aimed at violating the confidentiality of the keys used. Numerous types of attacks are known nowadays.

Thus, certain attacks rely on information leaks detected during the execution of the enciphering algorithm. They are generally based on a correlation between the information leaks detected during the processing by the algorithm for enciphering the data item and the secret key or keys used. Thus, DPA ("Differential Power Analysis") attacks are known. In general they require knowledge of the encrypted output data. Likewise, SPA ("Simple Power Analysis") attacks are known, based on an analysis of a simple graph of power consumption, as described in the document "Smartly analyzing the simplicity and the power of simple power analysis on Smartcards", Rita Mayer-Sommer electrical engineering division ETH Zurich, 2000.

A cryptographic algorithm generally comprises several linear and/or nonlinear operations. For an initial data item to be encrypted, an intermediate data item being encrypted is obtained after each of the operations of the algorithm.

Thus, an algorithm of DES ("Data Encryption Standard") type or else the AES ("Advanced Encryption Standards") algorithm comprises nonlinear operations. DPA and SPA attacks turn out to be particularly relevant against the AES algorithm during the execution of the nonlinear operations.

Several methods of protecting cryptographic algorithms of this type have already been proposed, in particular by masking the data being encrypted that are manipulated in the AES algorithm. The nonlinear operations are generally implemented in the form of substitution tables. Thus, a nonlinear operation corresponding to a substitution table tab[i], applied to a data item x may be written in the following form:

$$y=tab[x].$$

It is sometimes complex to mask a data item in the course of a nonlinear operation with a random value mask.

The present invention is aimed at proposing an easy to implement process for effectively protecting executions of calculations of the cryptographic algorithms based on at least one secret key against DPA or else SPA attacks.

A first aspect of the invention proposes a method of executing a cryptographic calculation in an electronic component, according to a determined cryptographic algorithm including at least one secret-key operation to be carried out with a secret cryptographic key comprising m secret cryptographic key blocks of n bits on a data block, where m and n are positive integers. The method comprises, for a given secret cryptographic key block, the following steps consisting in:
  determining $2^n-1$ different secondary secret keys on n bits, each key being different from said secret cryptographic key block;
  carrying out said secret-key operation with said secret cryptographic key block and with said secondary secret keys on a data block and obtaining respectively a data block being encrypted and $2^n-1$ secondary data blocks;
  carrying out said nonlinear operation on said data block being encrypted and on said secondary data blocks;
  providing an encrypted data block on the basis of the data block being encrypted.

Note that the secondary secret keys are dummy keys.

By virtue of these provisions, information leaks linked with the cryptographic calculations executed on a secondary data block are generated in addition to the information leaks linked with the cryptographic calculations executed on a data block being encrypted. An analysis of such information leaks is therefore more complex and hence takes more time than the analysis of information leaks during the execution of cryptographic calculations on the data block being encrypted only. The confidentiality of the secret cryptographic keys is thus protected. The complexity of an attack of such an algorithm increases with the number of times that the secret-key operation 102 is carried out with a different dummy secondary secret key.

Such a method is aimed at revealing correlation biases for rendering SPA or DPA attacks lengthier or even impossible.

Thus, in an embodiment of the present invention, in order to guarantee better confidentiality of the algorithm, for a secret cryptographic key block, we determine all the possible values of n-bit keys, that is to say $2^n$ values, or else $2^n-1$ n-bit dummy secondary secret keys different from the secret cryptographic key block. Then, the secret-key operation is carried out with the secret cryptographic key and also all these determined secondary secret keys. We thus obtain a data block being encrypted and $2^n-1$ secondary data blocks on which the nonlinear operation is carried out. In this case, the secret cryptographic keys are not detectable.

In an embodiment of the invention, the method comprises, for a secret cryptographic key block, the steps consisting in:
  determining and arranging the secondary secret keys randomly in an initial table comprising said secret cryptographic key block;
  storing in memory the address corresponding to said secret cryptographic key block in the initial table;
  applying the secret-key operation to the data block with the keys of the initial table and obtaining a first transformed table of $2^n$ first elements, each first element corresponding to the result of the secret-key operation applied to the data block with the key situated in the initial table at the same address as said first element;
  applying said nonlinear operation to the elements of said first transformed table and obtaining a second transformed table of $2^n$ second elements, each second element corresponding to the result of the nonlinear operation applied to the first element situated at the same address in the first transformed table as said second element;
  retrieving, from the second transformed table, the element corresponding to the data block being encrypted situated at the address of said secret cryptographic key block.

The initial table advantageously comprises all the possible key values.

By virtue of these provisions, all the possible keys are manipulated in an equiprobable manner when the secret-key operation and the nonlinear operation are executed. Such a method guarantees very high protection of the confidentiality of the algorithm as regards DPA and SPA attacks.

The element corresponding to the data block being encrypted can be retrieved from the second transformed table via a function resistant to an attack of SPA type taking as parameter the address of the given secret cryptographic key block. The expression "function resistant to attacks of SPA type" is understood to mean a function for which it is not possible to determine a secret key in a single trace of a leak. On considering that the leak signal W corresponding to a current, or else to an electromagnetic field, during manipulation of a byte α for a calculation of the algorithm, is of the following form:

$$W(\alpha)=H(\alpha)+b;$$

where H(α) is the leak model and b the extrinsic and intrinsic noise.

A function executed on the byte α is considered to be a function resistant to SPA attacks when we have the following equation:

$$|W_\alpha - W_{\alpha'}| \leq b,$$

where α' is another byte.

When the cryptographic algorithm comprises a determined number of rounds, each including at least one secret cryptographic-key operation preceding a nonlinear operation, carried out via a substitution table, the method steps set forth hereinabove may be carried out for at least the first round and at least the last round of the cryptographic algorithm.

Specifically the first and last rounds of the AES algorithm are the most fragile in the face of SPA and DPA type attacks. Thus, by applying the method according to an embodiment of the present invention to the first round and to the last round, the confidentiality of the algorithm is protected while limiting the number of calculations to be added for the protection of this algorithm.

The step of random arranging of the keys in the table may be carried out at each start of the cryptographic algorithm.

Moreover, the secret-key operation may be carried out simultaneously with a secret cryptographic key block and with the secondary secret key and/or the nonlinear operation may be carried out simultaneously on the data block and the secondary data blocks so as to provide good performance as regards the execution of the calculations of the algorithm.

In an embodiment of the present invention, the cryptographic algorithm is the AES.

In an embodiment of the present invention, one at least of the operations of the cryptographic algorithm is carried out on the data block being encrypted masked with a random value. Preferably, the operations of the algorithm other than those carried out with the secondary secret keys and those carried out on secondary data blocks are carried out on a data block being encrypted which is masked.

Another aspect of the invention proposes an electronic component adapted for executing a cryptographic calculation according to a determined cryptographic algorithm including at least one secret-key operation to be carried out with a secret cryptographic key comprising m secret key blocks of n bits on a data block and a nonlinear operation, comprising means devised for implementing a method as set forth hereinabove.

Other aspects, aims and advantages of the invention will become apparent on reading the description of one of its embodiments.

The invention will also be better understood with the aid of the drawings, in which.

Generally, a cryptographic algorithm comprises several operations which are applied successively to a data block, each operation being applied to the data block transformed by the previous operation. At the output of the algorithm, a data block being encrypted is an encrypted data block.

Figure 1:
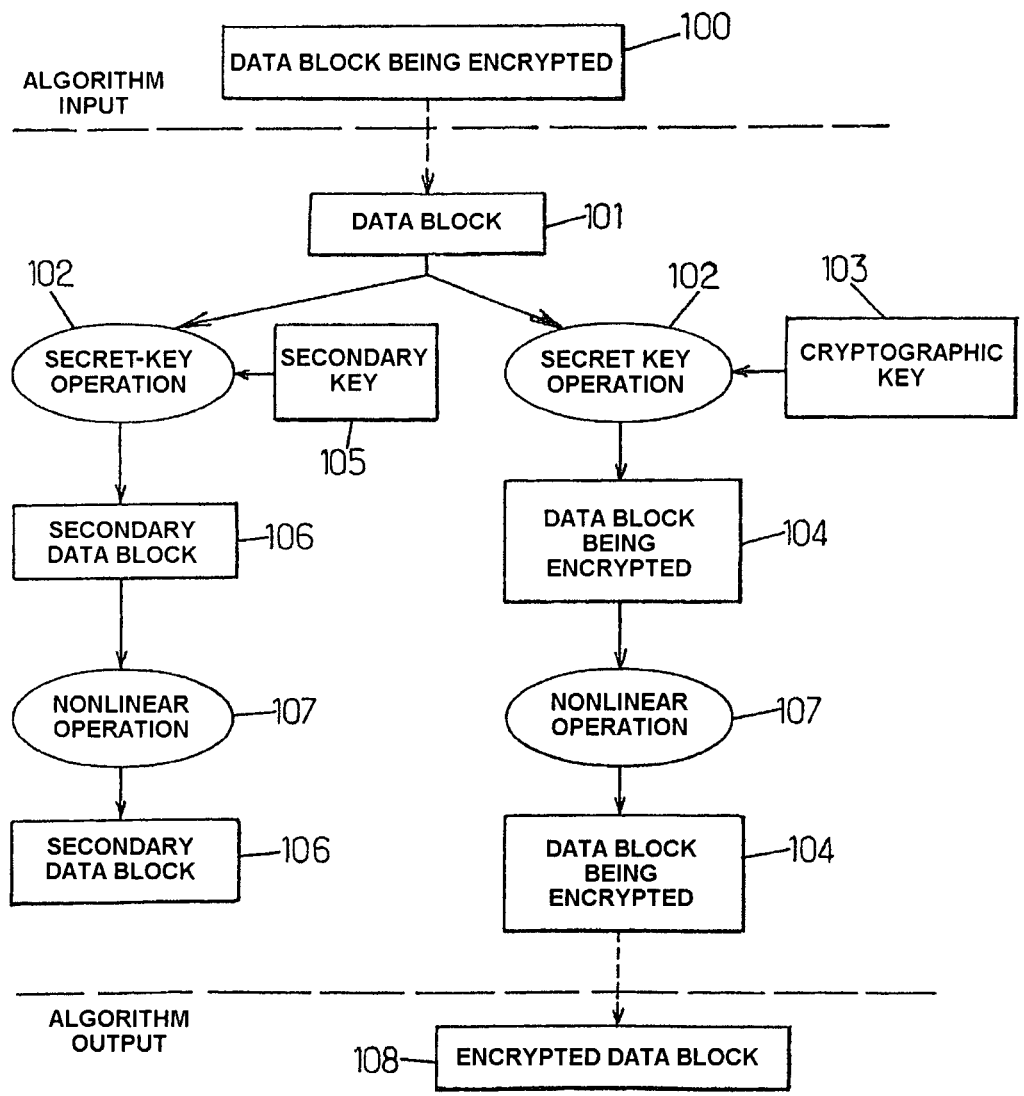
FIG. 1 illustrates a method of cryptographic calculation according to an embodiment of the present invention.

FIG. 1 illustrates a method of executing a cryptographic calculation according to a cryptographic algorithm, according to an embodiment of the present invention. Such an algorithm includes at least one secret-key operation 102 to be carried out with a secret cryptographic key 103 on a data block 101, to obtain a data block being encrypted 104. The algorithm also includes a nonlinear operation 107 to be carried out on the data block being encrypted 104 to obtain another data block being encrypted 104. The data block 101 may be the result of a previous operation in the case where one or more operations precede the secret-key operation 102. In the case where the secret-key operation 102 is the first operation of the algorithm, it may correspond to the data block to be encrypted 100, received as input to the algorithm.

By way of example, in the case where the secret-key operation is carried out with a 128-bit secret cryptographic key comprising 16 secret cryptographic key blocks of one byte each, the secret-key operation 102 is carried out 16 times on a data block of one byte, once with each of the secret cryptographic key blocks. After having determined a secondary secret key value 105 different from the value of the corresponding secret cryptographic key block 103, the operation 102 is carried out with the secondary secret key 105 determined on the data block 101 to obtain a secondary data block 106. Then, the nonlinear operation 107 is applied to this secondary data block to obtain another secondary data block 106.

An encrypted data block 108 is obtained as output of the cryptographic algorithm.

The invention covers all possible implementations, that is to say the cases where the operation is carried out with a secondary secret key before, simultaneously or after the operation with the secret cryptographic key blocks.

Given that the nonlinear operations are the most fragile in the face of DPA or SPA type attacks, they are protected as a priority. Thus, when the cryptographic algorithm comprises linear operations after the nonlinear operation 107, it is preferable to carry out these operations only on the data block being encrypted 104 so as to limit the number of calculations to be executed.

The present invention is described hereinafter in its non-limiting application to an algorithm of AES type and more particularly to an AES algorithm manipulating keys of 16 bytes.

Figure 2:
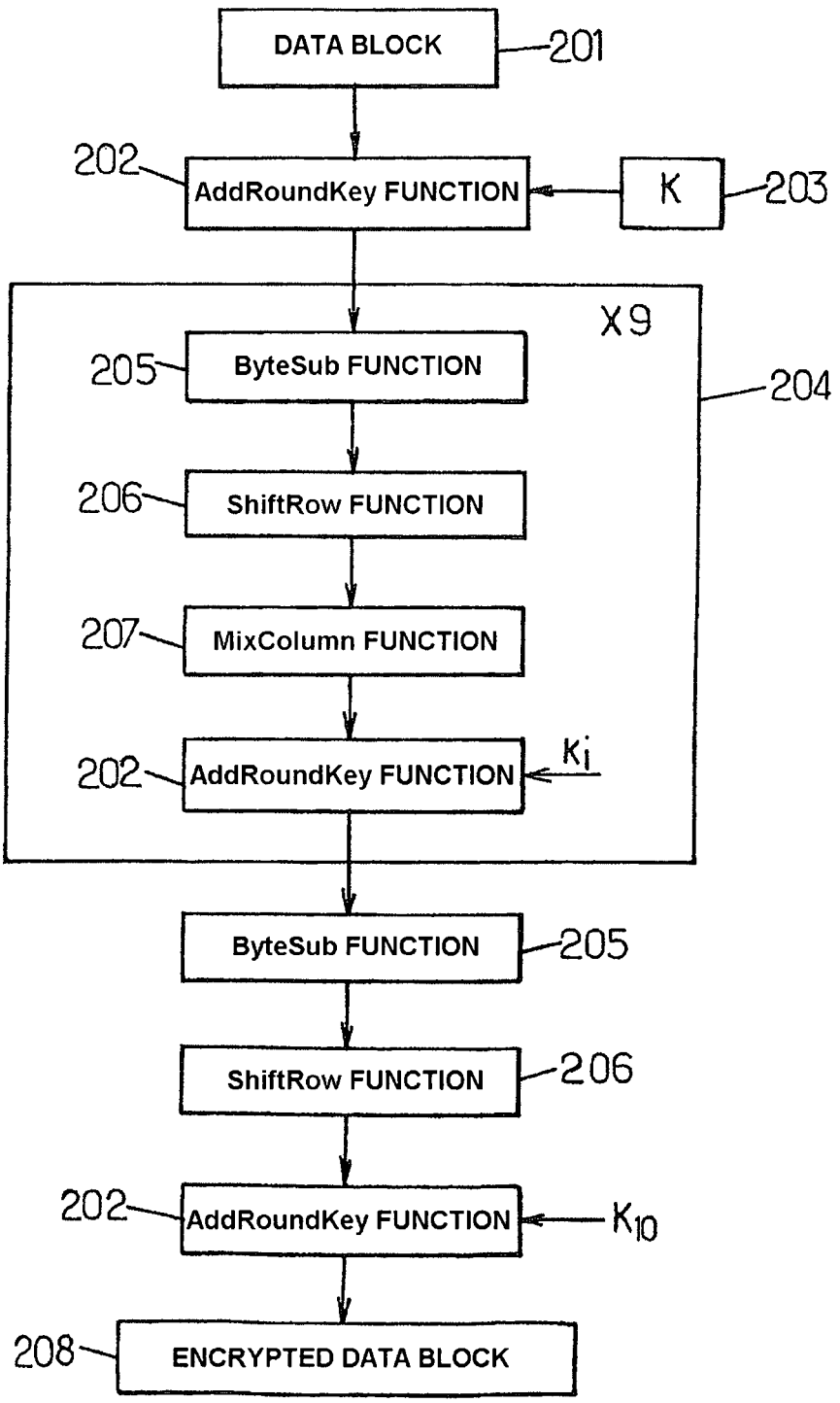
FIG. 2 illustrates the main steps of an algorithm of AES type.

FIG. 2 illustrates a method of cryptography according to an AES type algorithm. Such an algorithm takes as input an initial data block to be encrypted 201 to provide as output a corresponding encrypted data block 208.

The algorithm comprises several rounds. It is generally based on a main secret key K. A main key can have a size of 128 bits, of 192 bits or else of 256 bits. Such a key is conventionally derived as a plurality of keys, denoted $K_i$. The derived keys have a size of 16 bytes for an algorithm manipulating 128-bit keys, a size of 24 bytes for an algorithm manipulating 192-bit keys and a size of 32 bytes for an algorithm manipulating 256-bit keys.

It is considered by way of example that the main secret key K is of size 128 bits and is derived as 10 keys of 16 bytes, each of these keys being used in a specific round.

The initial message to be encrypted has a size of 128 bits. It is generally processed in initial data blocks of one byte 201. To a data block of one byte for a determined round of the algorithm there corresponds a byte of a key.

The message to be encrypted is conventionally represented in the form of a 4×4 state matrix of 16 8-bit initial data blocks. The 8-bit data blocks may be processed one after the other or else simultaneously. The invention covers all these implementations.

This message to be encrypted is firstly transformed by a secret cryptographic-key operation 202, conventionally referenced "AddRoundKey". This operation 202 adds the main key K 203 to the initial data block 201 by an exclusive or.

The main secret key K 203 is used during the first application of the operation 202 to obtain a data block being encrypted. Then the data block enters a first round 204. For a 128-bit key, such an algorithm conventionally comprises 9 rounds 204 each comprising the following same successive operations:

an operation 205, conventionally referenced "ByteSub"; the latter is a nonlinear function generally implemented in the form of a substitution table;

an operation 206, conventionally referenced "ShiftRow"; the latter is a function that operates row shifts on the state matrix;

an operation 207, conventionally referenced "MixColumn; the latter is a function for jumbling columns on the state matrix; and the operation 202 "AddRoundKey" with the key $K_r$ corresponding to the round $T_r$.

Then, the operation 205 "ByteSub", the operation 206 "ShiftRow", and finally the operation 202 "AddRoundKey" with the key $K_{10}$ are applied again to the data block being encrypted thus obtained on completion of the 9 rounds.

For each of the rounds $T_r$, for r equal 1 to 9, a secret key $K_r$ derived from the main secret key is used for the execution of the operation 202 "AddRoundKey".

The value of the ith byte of the key at round $T_r$ of the AES is denoted $K_{i,r}$, where i lies between 1 and $L_r$, where r lies between 1 and $N_r$ with $N_r=10$ and $L_r=16$ in the case where the AES algorithm manipulates 128-bit keys, $N_r=12$ and $L_r=24$ in the case where the AES algorithm manipulates 192-bit keys and $N_r=16$ and $L_r=32$ in the case where the AES algorithm manipulates 256-bit keys.

M denotes the input message to be encrypted by the algorithm and Mi, for i equal 1 to 16, denotes the corresponding initial data blocks of one byte. Thus, each of the one-byte secret cryptographic key blocks of the secret cryptographic key is applied to each one-byte data block to be processed by the algorithm.

The secret-key operation 202 "AddRoundKey" is carried out with a secret cryptographic key block to obtain a data block being encrypted and also with the secondary secret keys that are different from the secret cryptographic key block and different from one another to obtain a secondary data block. The bigger the number of secondary secret keys, the more complex and lengthier to violate is the confidentiality of the secret cryptographic key.

For this purpose, in a preferred embodiment, an initial table comprising all the possible values of one byte is constructed randomly. Thus, such a table comprises in particular the secret cryptographic key block to be applied to the data block by the operation "AddRoundKey" 202.

Such a table of keys comprises 256 elements, taking the values from 1 to 256. These values are arranged in a random order.

In a preferential embodiment, this table is created at each run of the AES algorithm.

Figure 3:
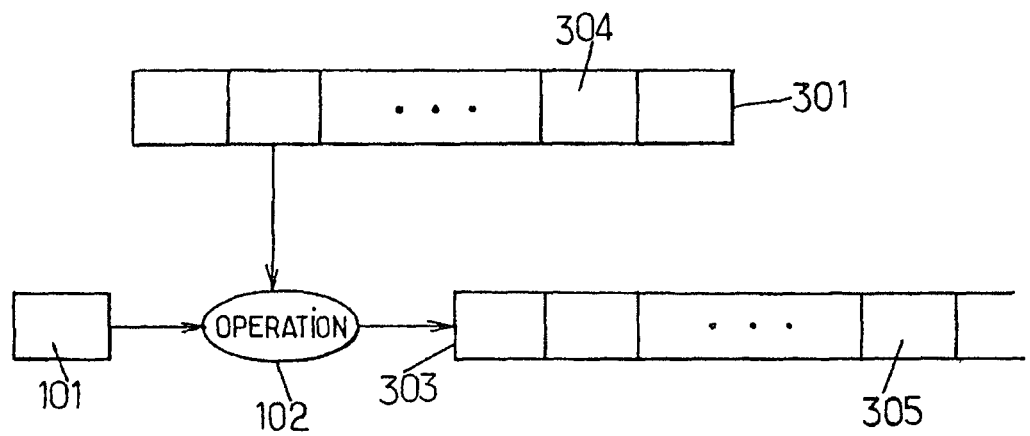
FIG. 3 illustrates a secret-key operation according to an embodiment of the invention.

FIG. 3 illustrates a secret-key operation 102 according to an embodiment of the invention. Such an operation can correspond to the operation "AddRoundKey" 202 modified according to an embodiment of the invention.

The operation 102 is an operation to be carried out with a secret cryptographic key block K 304 written on n bits. A table 301 comprises elements corresponding to all the possible values, i.e. $2^n$ elements, arranged randomly. By way of example, n is equal to 8. An element 304 corresponds to a secret cryptographic key block of the secret-key operation 102. The secret cryptographic key block is searched for in the table 301 preferably via a function resistant to SPA attacks. This type of search function is well known to the person skilled in the art and is not detailed in this document. Preferably, the address of the secret cryptographic key block is then stored in memory.

The secret-key operation 102 is applied to the data block 101 with all the elements of the table 301 comprising the values of keys, either simultaneously, or sequentially. One thus obtains a transformed table 303 which comprises $2^n$ elements, i.e. 256 elements. Each of these elements corresponds to the result of the operation 102 applied to the data block 101 with the secret key situated in the table 301 at the same address as this element. This table 303 comprises in particular an element 305 corresponding to the data block being encrypted, this block being the result of the secret-key operation 102 applied with the secret cryptographic key block 304.

The operation being applied in an equiprobable manner with all the possible key values, this step is protected against any attack relating to an analysis of the information leaks during the execution of the calculation.

Then, in an AES type algorithm, the secret-key operation is followed by a nonlinear operation 107 "ByteSub". Such an operation may be a source of valuable information during SPA or DPA attacks. It is therefore very important to protect its execution. Thus, in a preferred embodiment of the invention, such an operation is applied to all the elements of the table 303.

Figure 4:
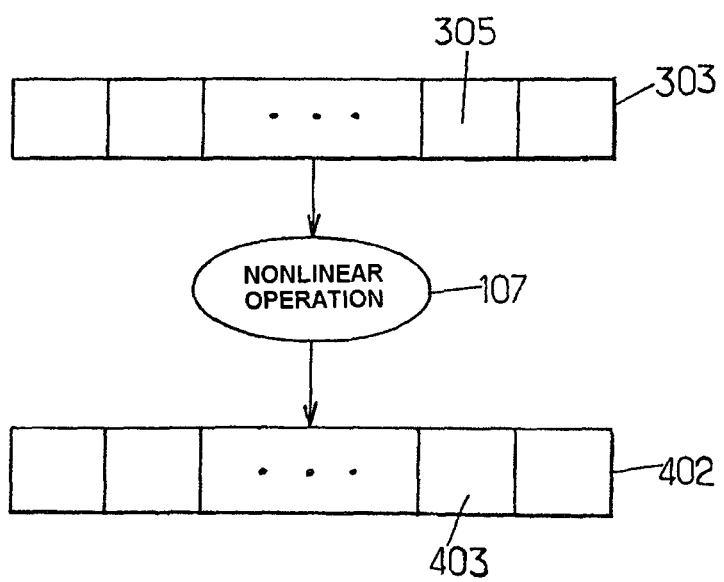
FIG. 4 illustrates the execution of a nonlinear operation according to an embodiment of the present invention.

FIG. 4 illustrates the execution of a nonlinear operation according to an embodiment of the present invention. Thus, the nonlinear operation 107 is applied either simultaneously, or sequentially, to all the elements of the table 303 to provide a table 402 which comprises $2^n$ elements, i.e. 256 elements. Each element corresponds to the result of the nonlinear operation applied to the element of the table 303 that is situated at the same address.

Thus, it is possible to retrieve the data block being encrypted 403 as soon as the address of the secret cryptographic key block in the table 301 comprising the keys has been stored in memory.

The data block being encrypted 403 is then retrieved from the table 402 on the basis of the address of the secret cryptographic key block previously stored in memory, preferably, by means of a function resistant to SPA attacks.

It is then possible to carry out the operations "ShiftRow" 206, "MixColumn" 207 only on the data block being encrypted and no longer on the secondary data blocks, arising from operations with secondary secret keys and not secret cryptographic key blocks. The latter operations are then preferably carried out by applying random value masks to the manipulated data block being encrypted.

In an algorithm of AES type, all or part of the "AddRoundKey" operations 202 may be carried out according to an embodiment of the invention.

In certain cases, one may wish to execute only part of the operations "AddRoundKey" 202 and "ByteSub" 205 of the algorithm according to an embodiment of the present invention. In this case, preferably the operations "AddRoundKey" 202 and "ByteSub" 205 will be executed according to the invention at the start of the algorithm, that is to say in at least the first round of the algorithm, or at the end of the algorithm, that is to say in at least the last round of the algorithm.

In order to improve the protection against the previously described attacks, it is advantageous to mask the manipulated data blocks being encrypted. The masking may be carried out easily by adding a random value by an exclusive or.

Figure 5:
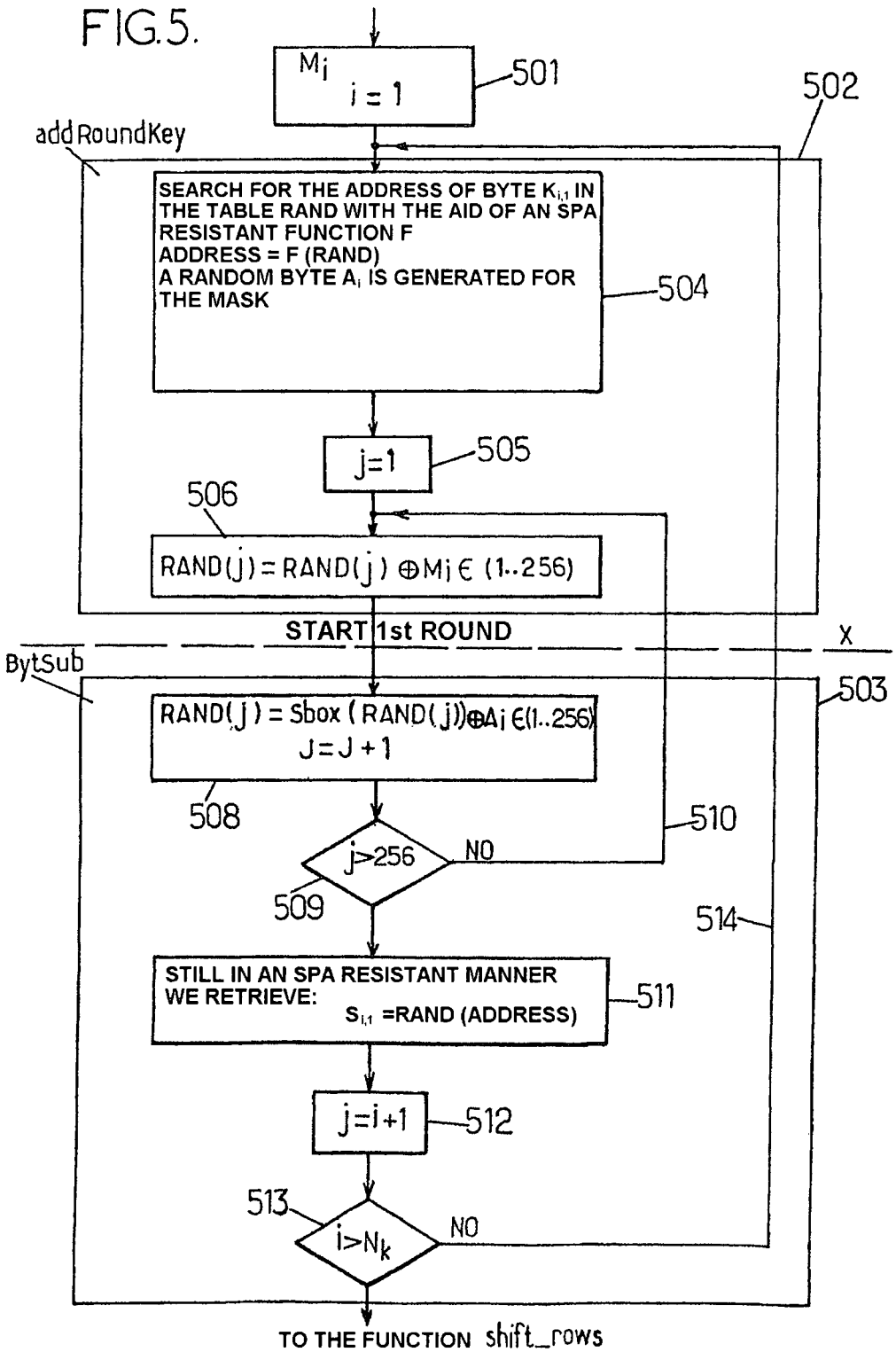
FIG. 5 illustrates a management of the pass at the first round of an algorithm of AES type comprising cryptographic calculations executed according to an embodiment of the present invention.

FIG. 5 illustrates the steps for encrypting a 16-byte message according to an AES type algorithm comprising cryptographic calculations executed according to an embodiment of the present invention, and more particularly the pass at the first round. In this figure, the table containing all the values of keys is denoted RAND[j]. This table comprises the values from 1 to 256 arranged randomly. The message to be encrypted M is composed of 16 data blocks of one byte each, $M_i$ for i equal 1 to 16.

Thus, at the start of the algorithm, the first byte $M_1$ 501 of the message to be encrypted M is processed first of all.

In step 502, the operation "AddRoundKey" is carried out according to an embodiment of the invention. Thus, in a first step 504, the secret cryptographic key block $K_{i,1}$ is searched for first of all in the table RAND[j] via a function resistant to SPA attacks to obtain its position in this table and a random byte value $A_i$ is generated used to mask the manipulated data block. Then, a loop is executed for j equal to 1 up to j equal 256 via steps 505, 506, 508, so as to apply the "AddRoundKey" operation with all the keys of the table RAND[j] followed by the execution of the "ByteSub" operation. When all the elements of the table RAND[j] have been processed, in step 511 the data block being encrypted corresponding to the result of the operations on the data block $M_1$ with the corresponding secret cryptographic key block is retrieved, via a function resistant to SPA attacks.

Next, i is incremented in step 512. All the operations described previously are thus repeated on all the bytes $M_i$ of the message to be encrypted. Then, the operations "SiftRows" and "MixColumn" are applied to the data blocks being encrypted thus obtained, these operations preferably being carried out in a masked fashion.

Figure 6:
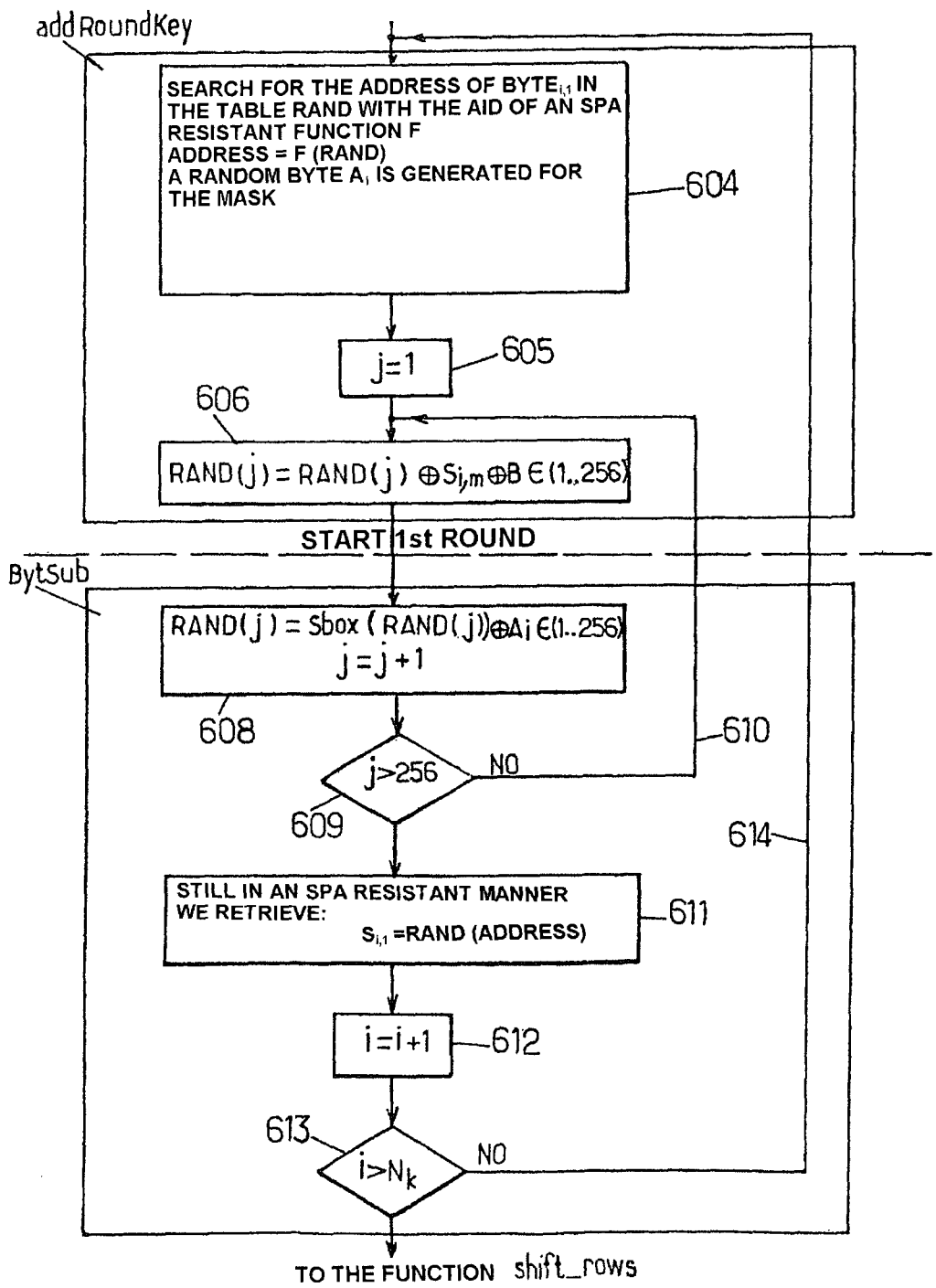
FIG. 6 illustrates a management of the pass between two consecutive rounds of an algorithm of AES type comprising cryptographic calculations executed according to an embodiment of the present invention.

FIG. 6 illustrates the steps for encrypting a 16-byte message according to an AES type algorithm comprising cryptographic calculations executed according to an embodiment of the present invention and more particularly the pass between two consecutive rounds of the algorithm.

Step 602 represents the operation "AddRoundKey" executed at the end of a round of the algorithm. Steps 602 and 603 are similar to the steps of the FIG. 5 described previously. It is noted that in step 606 the calculation is masked by adding by an exclusive or a mask B, which is a random value.

Thus, during an attack on the nonlinear operation, all the information leaks linked with the nonlinear substitution operation are collected in an equiprobable manner since this operation is carried out on all the secondary data blocks and the data block being encrypted. In this way, during a DPA attack conducted during the execution of calculations of the algorithm according to an embodiment of the invention, it is possible to detect 256 biases, 1 bias for each key byte f. Consequently, all the hypotheses regarding keys are validated by an attack of this type. The confidentiality of the secret keys is thus preserved.

In order to preserve good execution performance of the cryptographic algorithm, part of the calculations executed according to the invention can advantageously be carried out simultaneously and hence in parallel.

The invention claimed is:

1. A method of executing a cryptographic calculation in an electronic component that executes at least one secret-key operation to be carried out on a data block with a secret cryptographic key comprising m secret cryptographic key blocks of n bits, and executes a nonlinear operation, wherein the method of executing the cryptographic calculation causes the electronic component to leak a signal corresponding to a current consumed by the electronic component or corresponding to an electromagnetic field generated by the electronic component when the electronic component is of executing the cryptographic calculation, the method comprising modifying the leaked signal during executing the cryptographic calculation, so as to reduce correlation between the leaked signal and the secret key operation, wherein modifying the leak is accomplished by modifying the manner in which executing the cryptographic calculation is executed, the method comprising:

for a given secret cryptographic key block, using the electronic component to perform the method including:

determining $2^n-1$ additional and different secondary secret keys on n bits, each additional and different secondary secret key being different from said secret cryptographic key block;

carrying out, in addition to said secret-key operation with said secret cryptographic key block, $2^n-1$ secret-key operations with said secondary secret keys on a data block, and obtaining respectively an encrypted data block being encrypted with said secret cryptographic key block and additionally $2^n-1$ encrypted secondary data blocks encrypted with said respective secondary secret keys;

carrying out said nonlinear operation on said encrypted data block and in addition carrying out $2^n-1$ nonlinear operations on said secondary encrypted data blocks;

discarding the $2^n-1$ results of the $2^n-1$ additional nonlinear operations, and providing a resultant encrypted data block on the basis of the encrypted data block.

2. The method as claimed in claim 1, further comprising:

(a) determining and arranging the secondary secret keys randomly in an initial table comprising said secret cryptographic key block;

(b) storing in memory the address corresponding to said secret cryptographic key block in the initial table;

(c) applying the secret-key operation to the data block with the keys of the initial table and obtaining a first transformed table of $2^n$ first elements, each first element corresponding to the result of the secret-key operation applied to the data block with the key situated in the initial table at the same address as said first element;

(d) applying said nonlinear operation to the elements of said first transformed table and obtaining a second transformed table of $2^n$ second elements, each second element corresponding to the result of the nonlinear operation applied to the first element situated at the same address in the first transformed table as said second element;

(e) retrieving, from the second transformed table, the element corresponding to the data block being encrypted situated at the address of said secret cryptographic key block.

3. The method as claimed in claim 2, according to which the element corresponding to the data block being encrypted is retrieved from the second transformed table via a function resistant to an attack of SPA type ("Simple Power Analysis") taking as parameter the address of the secret cryptographic key.

4. The method as claimed in claim 2, wherein the method includes a determined number of rounds, each including at least one secret cryptographic-key operation preceding a nonlinear operation;

and according to which steps (a) to (e) are carried out for at least the first round and at least the last round of the method.

5. The method as claimed in claim 2, according to which the step of random arranging is carried out at the start of the method.

6. The method as claimed in claim 1, according to which the secret-key operation is carried out simultaneously with one of the secret cryptographic key blocks and with the secondary secret keys, and/or the nonlinear operation is carried out simultaneously on the data block and the secondary data blocks.

7. The method as claimed in claim 1, according to which the method is the AES (Advanced Encryption Standard).

8. The method as claimed in claim 1, according to which one at least of the operations of the method is carried out on the data block being encrypted masked with a random value.

9. An electronic component adapted for executing a cryptographic calculation according to a determined cryptographic algorithm including at least one secret-key operation to be carried out with a secret cryptographic key comprising m secret cryptographic key blocks of n bits on a data block and a nonlinear operation, the electronic component being arranged for implementing a method as claimed in claim 1.

* * * * *